(12) United States Patent
Roziere (10) Patent No.: US 8,159,213 B2
(45) Date of Patent: Apr. 17, 2012

(54) INDUCTIVE NON-CONTACT MEASUREMENT OF A RELATIVE MOVEMENT OR RELATIVE POSITIONING OF A FIRST OBJECT RELATIVE TO A SECOND OBJECT

(75) Inventor: Didier Roziere, Nímes (FR)

(73) Assignee: Nanotec Solution, Nimes (FR)

( * ) Notice: Subject to any disclaimer, the term of this patent is extended or adjusted under 35 U.S.C. 154(b) by 861 days.

(21) Appl. No.: 11/994,817

(22) PCT Filed: Jul. 5, 2006

(86) PCT No.: PCT/FR2006/001591
§ 371 (c)(1),
(2), (4) Date: Jul. 31, 2008

(87) PCT Pub. No.: WO2007/006910
PCT Pub. Date: Jan. 18, 2007

(65) Prior Publication Data
US 2009/0140729 A1   Jun. 4, 2009

(30) Foreign Application Priority Data

Jul. 7, 2005 (FR) ..................... 05 07270

(51) Int. Cl.
*G01B 7/14* (2006.01)

(52) U.S. Cl. ............... 324/207.17; 324/207.24

(58) Field of Classification Search ............. 324/207.15, 324/207.16, 207.17, 207.18, 207.24
See application file for complete search history.

(56) References Cited

U.S. PATENT DOCUMENTS

| | | | | | |
|---|---|---|---|---|---|
| 3,121,228 | A | * | 2/1964 | Kalmus | 342/448 |
| 4,223,300 | A | * | 9/1980 | Wiklund | 340/870.31 |
| 4,556,886 | A | * | 12/1985 | Shimizu et al. | 340/870.32 |
| 4,816,759 | A | * | 3/1989 | Ames et al. | 324/207.17 |
| 5,087,866 | A | * | 2/1992 | Smith | 318/653 |
| 5,617,023 | A | | 4/1997 | Skalski | |
| 6,534,970 | B1 | | 3/2003 | Ely et al. | |
| 2004/0075428 | A1 | * | 4/2004 | Proksch et al. | 324/207.18 |
| 2006/0097733 | A1 | | 5/2006 | Roziere | |

FOREIGN PATENT DOCUMENTS

JP  63271112  * 11/1988 .............. 324/207.24

\* cited by examiner

*Primary Examiner* — Jay Patidar
(74) *Attorney, Agent, or Firm* — Greer, Burns & Crain, Ltd.

(57) ABSTRACT

A non-contact measurement method for a relative displacement or relative positioning of a first object relative to a second object, in which: at least one transmitting coil, placed on the first object, is excited by an alternating excitation signal, at least one alternating electronic output signal, generated by mutual inductance in at least one receiving coil, is detected; the at least one receiving coil being placed on the second object and in a magnetic field created by the at least one transmitting coil, and the relative displacement of the first object is determined relative to the second object using the at least one alternating electric output signal generated on the at least one receiving coil.

40 Claims, 4 Drawing Sheets

INDUCTIVE NON-CONTACT MEASUREMENT OF A RELATIVE MOVEMENT OR RELATIVE POSITIONING OF A FIRST OBJECT RELATIVE TO A SECOND OBJECT

The present invention concerns a non-contact measurement method for relative displacement or relative positioning of a first object with respect to a second object, using an inductive method. It also addresses a non-contact measurement system that implements this type of method, as well as the application of this method to position and alignment control, specifically of segmented telescope mirrors.

The primary, but not the sole, sector of application of the present invention is that of giant segmented mirror telescopes (GSMT) in which the Tip, Tilt and segmented mirror piston devices must be controlled with great resolution, as must the overall curve radius of the mirror, which is designated using the term GROC (global radius of curvature).

The publication "Segmented Mirror Control System Hardware for CELT [California Extremely Large Telescope]" by Terry S. Mast and Jerry E. Nelson, which appeared in the proceedings of SPIE 2000 [International Society for Optical Engineering], thus discloses a control system for segmented mirrors that uses capacitive motion sensors for three-dimensional control of the mirror's segments.

Use of capacitive technology edge sensors, arranged on the lateral walls of the mirror segments, is also known. Document WO 2004/020953 describes these sensors in a non-contact measurement system for relative positioning of two adjacent objects. This system implements a calculation of type (CA–CB)/CA+CB), where CA and CB represent capacitances that consist of two emitting electrodes and two receiving electrodes that are in a relative misalignment condition. This capacitive technology is very effective with regard to metrology but may be sensitive to the presence of dust and condensation. For giant telescope mirrors whose diameter does not exceed 10 m, it is still possible to limit the risk of the presence of dust and condensation. However, for telescopes of a diameter that could reach 100 m ("Extra Large Telescope"), the presence of dust and condensation on the sensors is inevitable. Under these conditions, the capacitive technology is at risk of not appropriately responding to the meteorological specifications required to control the position of the segmented mirrors.

Inductive technology offers the advantage of not being sensitive to this type of pollution. US document 48 16 759 describes these inductive sensors for measuring the relative displacement of two mirrors. Transmitting coils are arranged on the second mirror. The measurement is based on the principle of an impedance measurement by Eddy current ("courant de Foucault"). The Eddy current technique is very widely used in industry and in the laboratory. In document US 48 16 759, two transmitting coils are used that are excited by an alternating signal that addresses two receiving coils. These coils are connected to nil impedance so that they behave like a conductive target. Foucault currents are generated and, according to Lenz's law, these currents are opposite those of the source that gave rise to them. The induction created on the two transmitting coils modifies the reluctance of these coils. Under these conditions, the impedance of the transmitting coils varies with the distance that separates the transmitting coils from the receiving coils and the difference in the impedance of the two coils is sensitive to the coils' recovery rate, i.e. to the radial position (vertical in Z) between transmitter and receiver. The difference in impedance allows the radial position to be measured in order to determine Tip-Tilt and Piston.

One of the drawbacks of this concept is that the measurement is taken by measuring the impedance of one coil through a cable and that it is impossible to obtain proper position measurement stability over temperature and time because all parasitic impedances stack up with the reluctance being measured. The primary parasitic parameters are the resistivity of the transmitter and receptor coils, materials permeability, [and] impedance of the connector cables.

The goal of the present invention is to remedy the drawbacks of the prior art by proposing a new non-contact inductive measurement system for a relative displacement between two adjacent objects.

Another goal of the invention is to design a measurement system that is insensitive to the pollution associated with dust and condensation.

Another goal of the present invention is a very precise measuring system.

At least one of the abovementioned objectives is achieved with a non-contact measurement method of a relative displacement or a relative positioning of a first object relative to a second object, in which:

at least one transmitting coil, placed on the first object, is excited by an alternating excitation signal, at least one alternating electronic output signal generated by mutual inductance in at least one receiving coil, is detected; said at least one receiving coil being placed on said second object and in a magnetic field created by said at least one transmitting coil, and the relative displacement of the first object is determined relative to the second object using said at least one alternating electric output signal generated on said at least one receiving coil.

The alternating output electric signal may be an alternating current circulating on a load of the receiving coil, or an alternating voltage.

The word "coil" shall be taken to mean any circuit that is likely to transmit and/or sense or receive an electromagnetic field.

The voltage generated at the terminals of the receiving coil is proportional to the mutual inductance that is a function of the distance between the transmitting coil and the receiving coil.

With the method according to the invention, the mutual inductance between the transmitting and receiving coils is used. The voltages generated by the receiving coils by transformer effect are measured. Conversely, in the prior art, specifically in US document 48 16 759, the phase of the excitation signal applied to the transmitting coils is measured. In the prior art, this measurement is taken on the transmitter side, and the receiver ends with a null impedance. In the present invention, on the other hand, the voltage is detected at the receiving terminals, therefore with quasi-infinite impedance.

In other words, the sensor consists of a transmitter and a receiver mounted facing each other to measure the axial position over the "y" axis (air gap used for calculating the "GRoC") and radially over the "z" axis to measure the Tip-Tilt and Piston. The concept is based on the principle of mutual inductance between two coils placed facing each other. The transmitting coil (emitter) is excited by a voltage or an alternating current and through the air, induces a field in the receiving coil. An alternating electric voltage appears at the terminals of the receiving coil that is proportional to the mutual inductance. This mutual inductance is associated with the absolute distance separating the two coils and with their ratio of surface coverage. Under these conditions, the phenomenon is close to the capacitive phenomenon described in document WO 2004/020953. The output signal is not very sensitive to the parasitic impedances that constitute the sensor because the measurement is similar to that of a transformer whose magnetic circuit is air. In effect, in the present invention, said at least one transmitting coil and said at least one receiving coil constitute a transformer. Ideally, it involves one coreless transformer.

According to one embodiment, an axial displacement is determined by measuring a continuous axial voltage Va that is proportional to a monotone function, such as the inverse function, of the mutual inductance M between a transmitting coil and a receiving coil.

According to another specific embodiment of the invention, at least two receiving coils are used that generate, respectively, an alternative voltage va that is proportional to the mutual inductance Ma between one first receiving coil and said at least one transmitting coil, and an alternative voltage vb that is proportional to the mutual inductance Mb between a second receiving coil and said at least one transmitting coil.

The word "axial" shall be taken to mean the distance between the two objects, and the word "radial" the misalignment between the two objects.

In reference specifically to document WO 2004/020953, by replacing the capacitive electrodes with coils and the capacitances created by mutual inductances "M", it is shown that the axial position is associated with the formula 1/(Ma+Mb) and the radial position by (Ma−Mb)/(Ma+Mb).

Thus, according to the invention, a radial displacement is determined by measuring a continuous radial voltage Vr that is proportional to the relationship (Ma−Mb)·f(MA+Mb); where (Ma−Mb) is the difference between mutual inductances Ma and Mb, f(Ma+Mb) is a monotone function, such as the inverse function, of the sum (Ma+Mb) of mutual inductances Ma and Mb; where Ma is the mutual inductance between the transmitting coil and a primary receiving coil, Mb is the mutual inductance between the transmitting coil and a second receiving coil. Moreover, an axial displacement is determined by measuring a continuous axial voltage Va that is proportional to a monotone function, such as the inverse function, of the sum of mutual inductances Ma and Mb. The calculations may be performed electronically using analog operators such as multipliers, either by triggering excitation, or by triggering the signals taken by the receiver. When excitation control is used, the amplitude of the excitation signal of the transmitting coil may be triggered by the continuous axial voltage Va. Alternately, when triggering the signals at the receiver, the amplitude of the constant excitation signal can be sustained, and to measure the relative displacement, means for calculating the continuous voltage Va is triggered by this continuous axial voltage Va.

According to one specific embodiment of the invention, two transmitting coils are used, as well as one receiving coil. For a given position of the coils, an equilibrium inductance voltage is determined at the output of the receiving coil, and the radial positioning of the two objects is triggered by said equilibrium voltage. Preferably, this equilibrium voltage is null and the two coils are excited by two opposing excitation signals. This method allows the radial positioning to be controlled: the transmitter-receiver device is gauged for a given position, then each misalignment is detected and re-absorbed by a realignment of an object relative to another.

Preferably, said at least one transmitting coil is arranged facing the receiving coils. In particular, the overall surface presented by the transmitting coils is less than the overall surface presented by the receiving coils.

According to the invention, the emitter coil and the receiving coils may be differential coils. They may exhibit a rectangular, square, circular or other type, and may be of a flat or planar type.

They may be produced in the shape of loops arranged on flexible or rigid circuits, where these circuits are arranged on the objects or mirrors. More precisely, these flexible circuits are flexible printed circuits of which one side features loops of metal such as copper, specifically in a spiral shape. To improve the dimensional stability of the coils, the loop side may be glued directly onto the mirrored side. The very low rate of thermal expansion of the mirrors greatly reduces the deformation of the flexible circuits.

According to one embodiment, the coils are arranged on a material exhibiting a very low coefficient of thermal expansion in order to greatly reduce the deformation of these arranged coils. As a non-limiting example, the electricity-conducting paths constituting the coils may be arranged directly on a stable support such as Zerodur® which exhibits a thermal expansion coefficient of less than 0.1 ppm/° C. On the other hand, the thermal expansion coefficient of a flexible polyimide printed circuit is about 20 ppm/° C. and that of copper (metal constituting the loops of a coil) about 18 ppm/° C. It is possible to reduce, by a factor of about ten, this thermal expansion coefficient of a flexible polyimide printed circuit if this circuit is glued directly onto a Zerodur® support.

According to one frature of the invention, the alternating excitation signal is an alternating voltage or current, where this latter especially allows disturbances due to parasitic resistances to be overcome.

In particular, the transmitting and receiving coils are, respectively, arranged on two adjacent lateral sides of two mirrors of a telescope.

According to another aspect of the invention, a system of measurement of relative displacement or relative positioning of a first object relative to a second object is proposed that implements a method as described previously. This system includes:
  At least one transmitting coil placed on said first object,
  At least one receiving coil placed on said second object,
  Means for exciting said at least one transmitting coil into an alternating excitation signal, and
  Means of processing for recovering at least one alternating electric output signal, generated by mutual inductance in said at least one receiving coil, and for determining the relative displacement of the first object relative to the second object using said alternating electrical output signal generated on the receiving coil.

According to one embodiment, the system may include a transmitting coil and a receiving coil for measuring an axial displacement of objects by determining an axial voltage Va that is proportional to a monotone function, such as the inverse function, of the mutual inductance between the two coils.

According to another embodiment, the system may include two transmitting coils powered by the two opposing excitation signals so as to achieve control of the radial positioning. Measurement of the radial position can also be performed.

According to another embodiment, the transmitter of the inductive sensor produced may comprise two transmitting coils powered in series by the same alternating current so as to obtain maximum linearity and stability. And the receiver may consist of two coils whose mounting in series gives the sum of two mutual inductances and whose mounting in differential gives the difference between the two mutual inductances.

The electronics or means of processing for calculating the representative voltages of the radial and axial displacements may be carried out in different ways.

According to one advantageous feature of the invention, the processing means comprises means of calculation to determine a continuous voltage Vr representing a radial displacement, where Vr is proportional to the relation (Ma−Mb)·f(Ma+Mb); where (Ma−Mb) is the difference between mutual inductances Ma and Mb, f(Ma+Mb) is a monotone function, such as the inverse function, of the sum (Ma+Mb) of mutual inductances Ma and Mb. In this case, means of calculation may include:

- An adder for adding the difference in alternating voltages va−vb of the two receiving coils with a feedback signal,
- A demodulator for demodulating the signal emitted by said adder,
- An integrator for generating the continuous radial voltage Vr using the signal emitted by the demodulator, and
- A multiplier powered by the continuous radial voltage Vr and a reference voltage Vref for generating said feedback signal; the relative displacement is a function of the value of the continuous radial voltage Vr for which the output of said adder is null.

More precisely, the integrator may be replaced by a corrector of the Proportional-Integral-Derivative type, known as PID.

Otherwise, and also for determining continuous voltage Vr, the calculation means may include:

- A multiplier-adder for adding the difference va−vb of the voltages generated by receiving coils with a feedback signal multiplied by the sum va+vb of the voltages generated by the receiving coils,
- A demodulator for demodulating the signal emitted by said multiplier, and
- An integrator for generating the continuous radial voltage Vr using the signal emitted by the demodulator, where said feedback signal is the continuous radial voltage Vr; the reactive displacement is a function of the value of the continuous radial voltage Vr for which the output of said multiplier is null.

Likewise, means of processing comprises means of calculation for determining a continuous axial voltage Va which represents an axial displacement and which is proportional to a monotone function, such as the inverse function, of the sum of mutual inductances Ma and Mb. In this case, to calculate the continuous voltage Va and to trigger the excitation signal, means of calculation may comprise:

- An adder for adding the sum of alternating voltages va+vb of the two receiving coils with a reference voltage Vref,
- A demodulator for demodulating the signal emitted by said adder,
- An integrator for generating the continuous axial voltage Va using the signal emitted by the demodulator, and
- A multiplier powered by the continuous axial voltage Va and the reference voltage Vref so that it generates said excitation signal; the relative displacement is a function of the value of Va for which the output of said adder is null.

Otherwise, and also for calculating the continuous voltage Va and for, on the other hand, triggering the voltages generated, means of calculation may comprise:

- A multiplier-adder for adding a reference voltage Vref to a feedback signal multiplied by the sum va+vb of the voltages generated by the receiving coils,
- A demodulator for demodulating the signal emitted by said multiplier, and
- An integrator for generating the continuous axial voltage Va using the signal emitted by the demodulator, where the feedback signal is the continuous axial voltage Va; the relative displacement is a function of the value of the continuous axial voltage Va for which the output of said multiplier is null.

In particular, the reference voltage Vref may be multiplied by a coefficient kr for calculating the continuous radial voltage Vr, and ka for calculating the continuous axial voltage Va.

As an example, the processing method used comprises an adder amplifier designed to calculate the sum va+vb of the voltages generated by the receiving coils, and a differential amplifier designed to find the difference va−vb between the voltages generated by the receiving coils.

As a non-limiting example, the method described above is applied to control the position and the alignment of the telescope's segmented mirrors.

Through this application, the system described may be applied for measuring the relative position between two adjacent mirror segments. Plates, respectively transmitter and receiver, may be affixed to lateral surfaces facing two adjacent mirror segments, in close proximity to the active surfaces of said mirror segments. The non-contact measurement system is implemented preferably for position control (Tilt, Tip, piston and global radius of curvature (GROC) of the mirror) of the mirror's segments, notably in the domain of large-size, segmented-mirror telescopes.

Additionally, the monotone function, which may be noted f(x) is therefore preferably an inverse function such as $f(x)=1/x$, but it may also be of the type $f(x)=1/x^n$, or any other form more or less complex that allows a continuous signal to be obtained that is proportional to the axial displacement or position. The power "n" may depend on several parameters such as, for example, the size and shape of the coils and is not necessarily a whole number.

In general, the system according to the invention may be used for any other compatible non-contact measurement, in particular for a non-contact measurement of one- or two-axis position and displacement.

Other advantages and characteristics of the invention will become apparent upon examination of the detailed description of a manner of implementation that is in no way limiting, and of the attached drawings, in which.

Figure 1:
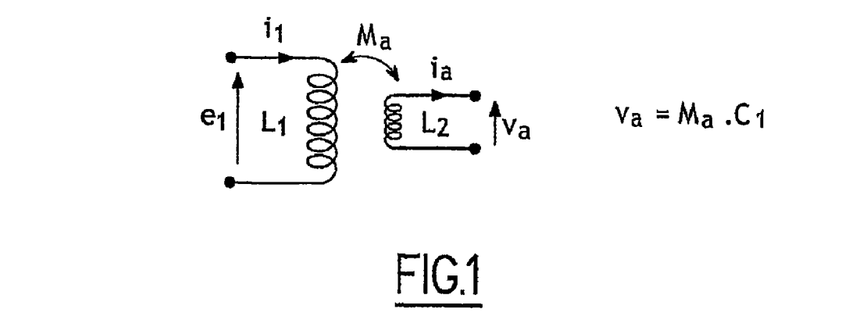
FIG. 1 is a simplified diagram illustrating the basic principle of the method according to the present invention.

In FIG. 1 a first embodiment is shown which illustrates the principle of the present invention, which is based on a coreless transformer. The primary consists of coil L1 which is the transmitter, whereas the secondary is coil L2 as receiver. The assembly constitutes an edge sensor used and integrated in a system according to the present invention. In fact, transmitter L1 is arranged on a first object facing receiver L2 arranged on a second object. Transmitting coil L1 is excited by an alternative voltage e1 or an alternative current i1 so as to create a magnetic field. By transformer effect, an alternative voltage va is created at the edges of the receiving coil L2 such that:

$$Va = Ma \cdot e1$$

where Ma is the mutual inductance between the two coils L1 and L2. Knowing that the mutual inductance is inversely proportional to the distance between the two coils, analog calculation may therefore, specifically by analog calculation, determine the relative axial displacement of the two coils. In this way, using the alternative voltage va at the terminals of the receiving coil L2, a continuous voltage Va is sought, of the type:

$$Va = \alpha/Ma$$

Where α is an unknown coefficient.

Figure 2:
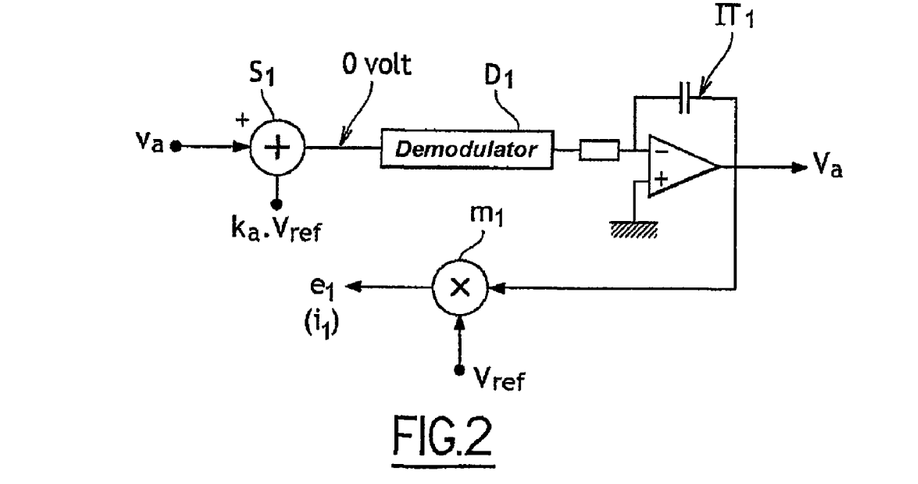
FIG. 2 is an electronic analog diagram for calculating the axial displacement with automatic control of the excitation signal.

So the analog calculation device as described in FIG. 2 is used. The alternative voltage va powers an adder S1. This latter also receives a value ka. Vref where ka is a known coefficient and Vref is a reference voltage. The output of adder S1 powers a demodulator D1 which is then connected, through a resistance, to an integrator IT1. The output of integrator IT1 is continuous voltage Va. This output powers a multiplier m1 so that it is multiplied by the reference voltage Vref and generates the excitation signal e1 (or i1).

In particular, the positive input of this integrator IT1 is earthed, which constrains the negative input to maintain itself at null voltage. In this way, the output of adder S1 is likewise constrained to a null voltage. The device leads to the following equations:

On S1: Output S1=0 volt

On S1: va+ka·Vref=0 volt

On m1: e1=Va·Vref

Consequently, with va=Ma·e1, the following is obtained:

$$Va \cdot Vref \cdot Ma + ka \cdot Vref = 0$$

Or: Va=−ka/Ma

The one ordinary skill in the art will easily understand that it is possible to achieve the method using a current ia generated at the output.

Figure 3:
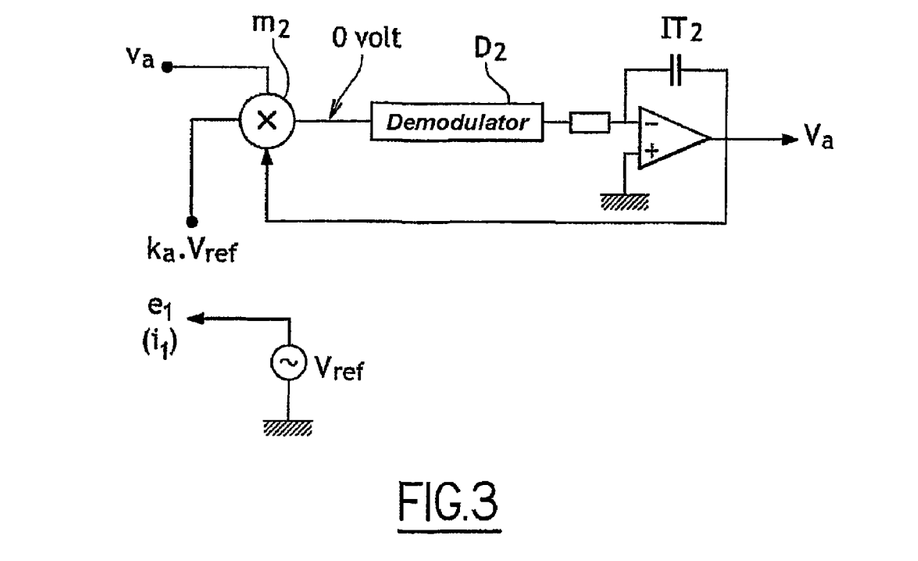
FIG. 3 is an electronic diagram of another example of analog calculation of axial displacement, without automatic control of the excitation signal.

The device thus described comprises an automatic control of the excitation signal e1 by continuous axial voltage Va. This embodiment may exhibit a drawback when there are several other edge sensors in proximity. In effect, the amplitude modulation of the excitation signal e1 may thus constitute a variable transmitter for these neighbouring sensors and thus create crosstalk. To reduce this problem, a provision has been made for maintaining constant excitation and processing only the signals at the receiver. FIG. 3 illustrates this second embodiment in which the alternating voltage va powers a multiplier m2 which also receives signal ka. Vref as well as continuous voltage Va. This multiplier m2 performs the following operation:

$$va \cdot Va + ka \cdot Vref$$

The output of multiplier m2 powers a demodulator D2 connected to an integrator IT2 via a resistance in the same way as in FIG. 2. The output voltage of IT2 is continuous axial voltage Va. Since IT2 applies a null voltage to the terminals of the demodulator and therefore to the output of multiplier m2, the following is obtained:

$$va \cdot Va + ka \cdot Vref = 0$$

Moreover, excitation signal e1 (or i1) is proportional to reference voltage Vref, Which gives va=Ma·Vref Finally:

$$(Ma \cdot Vref) \cdot Va + ka \cdot Vref = 0$$

Which gives Va=−ka/Ma

Figure 4:
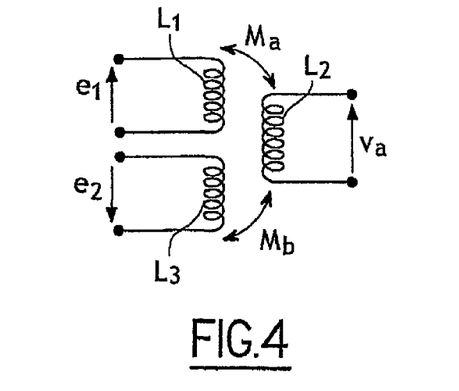
FIG. 4 is an example of embodiment of control or measurement of radial position.

In FIG. 4, an embodiment is shown in which control of the radial position is desired. To do this, two spools L1 and L3 are used at the transmission, which are respectively excited by e1 and e2, and a coil L2 at the receiver generating va. The mutual inductance between coil L1 and coil L2 is M1. The mutual inductance between coil L3 and coil L2 is M2.

The excitation voltages are opposites, e1 is positive whereas e2 is negative.

The device operates as follows. First, for a given position of L2, for example at equal distance from the two coils L1 and L3, e1 and e2 are adjusted so that va is null. For a constant axial position (distance), especially, it is thus possible to control the position of the receiving coil L2 relative to a transmitter plate that bears both transmitting coils L1 and L3. The calculations are performed according to the same principle as in FIGS. 2 and 3, where:

$$va = M1 \cdot e1 - M2 \cdot e2$$

Figure 5:
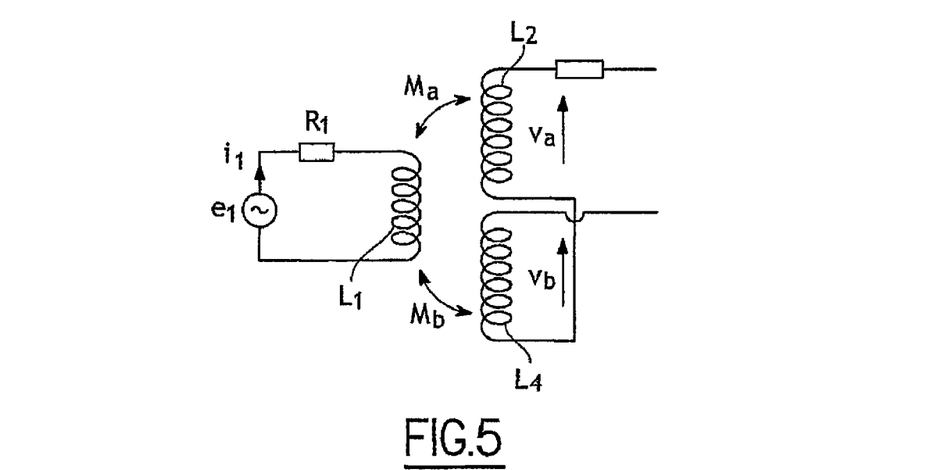
FIG. 5 is an example of preferential embodiment with one transmitting coil and two receiving coils.
Figure 6:
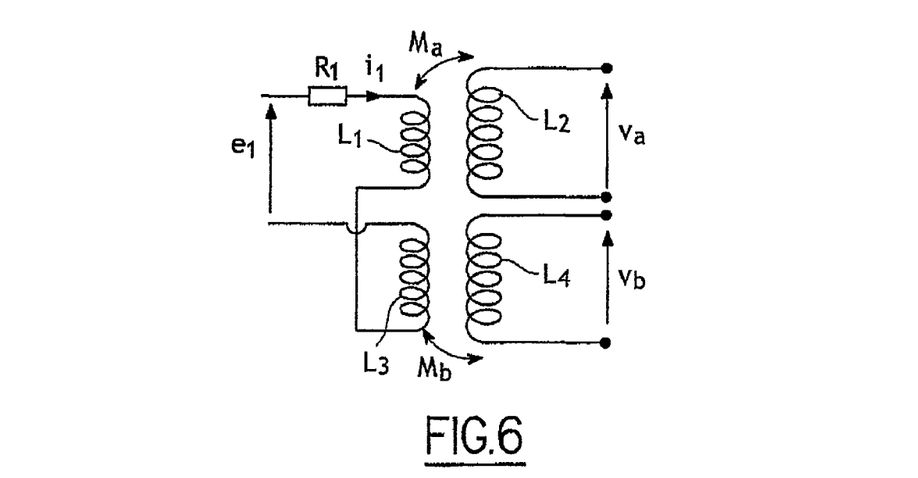
FIG. 6 is a simplified diagram of one embodiment consisting of two transmitting coils and two receiving coils.

In FIG. 5, another embodiment is shown in which a non-contact measurement of displacement or of axial and radial position is desired. This FIG. 5 illustrates the principle of this embodiment, whereas FIG. 6 illustrates a preferred variation of embodiment. In principle, two reception coils L2 and L4, generate two alternative voltages va and vb. va is proportional to mutual inductance Ma between the transmitting coil L1 and receiving coil L2. vb is proportional to mutual inductance Mb between transmitting coil L1 and receiving coil L4. Transmitting coil L1 is excited by an alternative voltage e1 or an alternating current i1 through a resistance R1.

It is known that (va−vb)/(va+vb) is proportional to (Ma−Mb)/(Ma+Mb) which is a function of the radial distance between the transmitter and the receiver.

Figure 7:
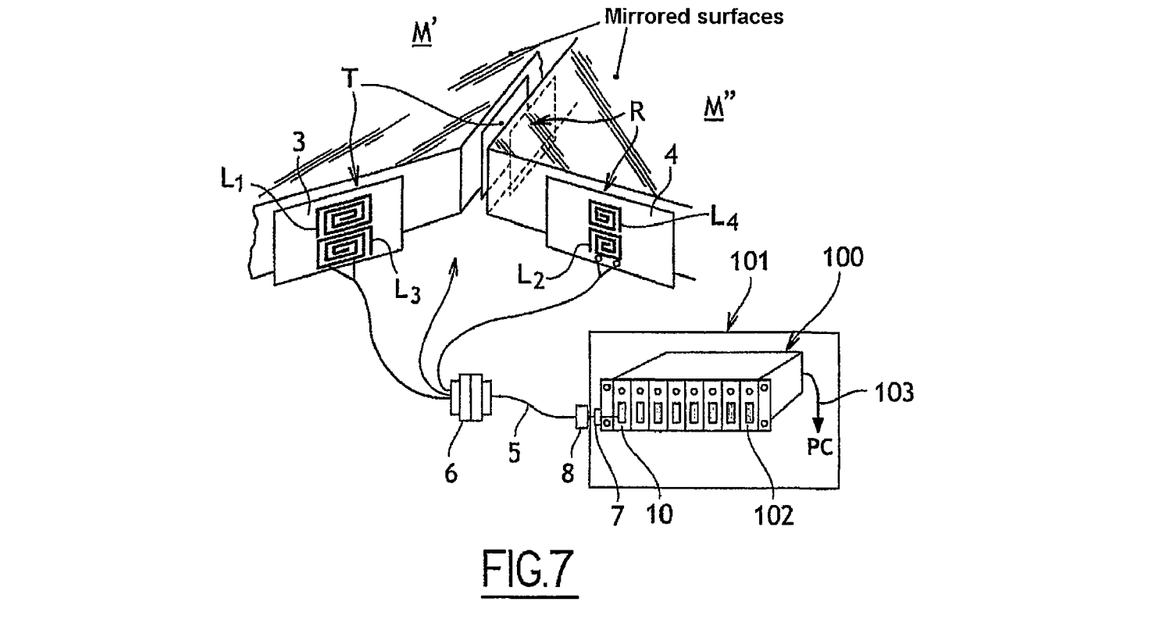
FIG. 7 is an assembly view of the system according to the invention associated with mirror segments for a giant telescope.

Preferably, as is shown in FIG. 6, two aligned transmitting coils L1 and L3 are arranged, in opposite directions and powered by an alternating current i1 so that resistance R1 is overcome. Resistance R1 in FIGS. 5 and 6 is an equivalent resistance taking into consideration especially the connecting cables and/or the excitation coil. Moreover, the size of the coils is optimized as a function of the applications. The transmitting coils may advantageously be of greater size than that of the receiving coils as shown in FIG. 7, or inversely as is shown in FIG. 6 for example.

In reference to FIG. 7, an example shall now be described of embodiment of a sensor module implemented in a non-contact measuring system according to the invention that is used for controlling an assembly of segmented mirrors. This sensor module, arranged between two mirror segments M', M", comprises a transmitter plate T attached to a lateral wall 1 of segment M' and a receiving plate R attached to a lateral wall 2 of segment M", where these two plates respectively transmitter and receiver T, R are largely facing each other and parallel.

Transmitter plate T consists, on a thin plane support 3 of insulating material, of two transmitting coils L1 and L3 which are square, rectangular, circular or otherwise in shape, and which are powered by the same current but in the opposite direction.

Receiving plate R consists, on a thin support plane 4 of insulating material, of two receiving coils L2 and L4 which are square, rectangular, circular or otherwise in shape.

As a non-limiting example, supports 3 and 4 may be of dimensionally stable material such as zerodur®, which allows the required dimensional stability to be obtained.

In one particular implementation, the supports may also be of flexible material, such as polyimide, glued onto the mirror. Gluing, using a thin resin, allows the thermal expansion coefficient of the sensor to be greatly reduced and the dimensional stability of the flexible material supporting the sensor to be improved, thanks to the low thermal expansion coefficient of the mirror. The flexible material may also be made with standard flexible printed circuit.

Since the two plates T, R respectively transmitter and receiver, are arranged in parallel and separated by a distance, in practice of a few mm to a few cm, a first mutual inductance is thus obtained between coils L1, L3 and coil L2, a second mutual inductance between coils L1, L3 and coil L4.

The sensor module is connected by one or more shielded cables 5 to an electronic processing module 10 installed in a rack 100 which may contain several electronic processing modules and which is arranged inside a container 101. The shielded cable is connected, on the one hand, to electrical conductors connected to a sensor module using a first connector 6 and on the other hand, to container 101 using a second connector 8 then to electronic equipment 10 using a third connector 7. Rack 100 also includes a multi-channel acquisition module 102 which is connected to the various electronic processing modules and to an exterior connection bus 103.

The location of the sensor module between two mirror segments allows a quality measurement because it is very near the optical surfaces. Moreover, due to the distant nature of the electronic processing modules, there is not thermal dissipation in the vicinity of the mirror segments.

Analog calculation brings into play the quantity $1/(Ma+Mb)$ which is a function of the axial distance between the transmitter and the receiver. It also brings into play the calculation of quantity $(Ma-Mb)/(Ma+Mb)$ which is a function of the radial distance between the transmitter and the receiver.

Figure 8:
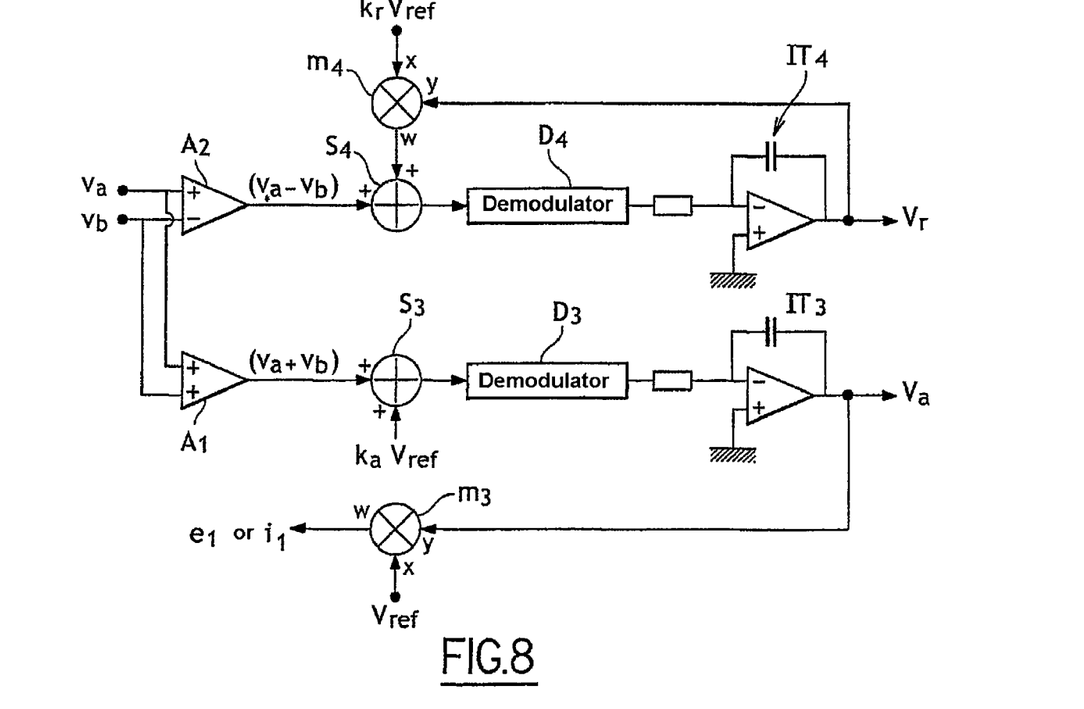
FIG. 8 is an electronic diagram of an analog calculation with automatic control of an excitation signal.

In FIG. 8, a first example is shown of the implementation in which the distinction is made of a first route of calculating the continuous axial voltage Va and a second route of calculating the continuous radial voltage Vr. For the first route, alternating voltages va and vb power an adding amplifier A1 which generates $(va+vb)$. Adder S3 receives signals $(va+vb)$ and signal ka·Vref. as input. Output S3 powers a demodulator D3 followed by an integrator IT3, which generates the continuous axial voltage Va, in the same way as in FIG. 2. IT3, through its positive earthed input, applies a null voltage to output S3:

$(va+vb)+ka\cdot Vref=0$.

Moreover, continuous axial voltage Va powers or steers a multiplier m3 which also receives signal Vref so that it generates excitation voltage e1 or excitation current i1. In this way, with $e1\cdot(Ma+Mb)=va+vb$:

$Vref\cdot Va\cdot(Ma+Mb)=va+vb$

Which gives, starting from output S3:

$Vref\cdot Va\cdot(Ma+Mb)+ka\cdot Vref=0$

Which gives $Va=-ka/(Ma+Mb)$

Va represents the axial distance while keeping the sum va+vb constant via the multiplier.

In the second radial calculation route, a differential amplifier A2 is distinguished which generates va−vb. Adder S4 receives this signal va−vb as well as a signal kr. Vref. Vr, where kr is a known coefficient and Vr is the continuous radial voltage. The output of adder S4 powers a demodulator Dr followed by an integrator IT4, which generates the continuous radial voltage Vr. ITr, through its positive earthed input, imparts a null voltage to output S4:

$(va-vb)+kr\cdot Vref\cdot Vr=0$

Moreover, knowing that $e1\cdot(Ma-Mb)=va-vb$:

$Vref\cdot Va\cdot(Ma-Mb)=va-vb$

Which gives, using the output from S4:

$Vref\cdot Va\cdot(Ma-Mb)+kr\cdot Vref\cdot Vr=0$

Knowing that $Va=-ka/(Ma+Mb)$, giving:

$Vr=(ka/kr)\cdot(Ma-Mb)/(Ma+Mb)$

Figure 9:
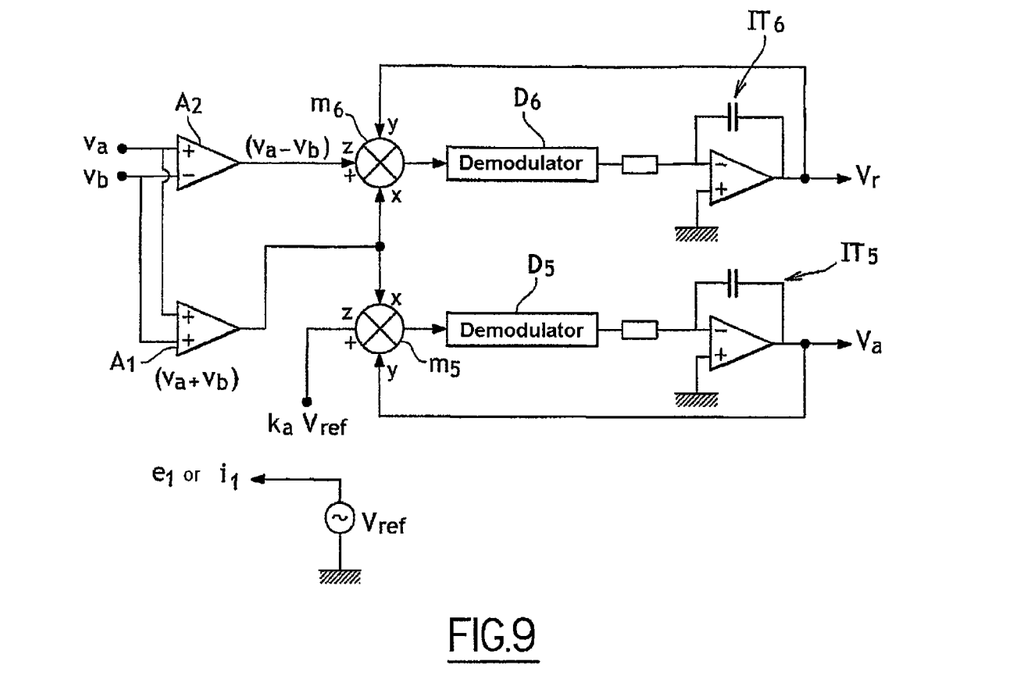
FIG. 9 is an electronic diagram of another analog calculation with a constant excitation signal.

FIG. 9 describes a preferred embodiment in which excitation signal e1 is no longer triggered by continuous axial voltage Va, but is held constant and is equal to reference voltage Vref.

Figure 10:
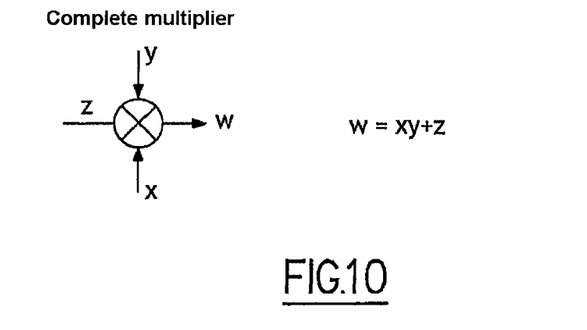
FIG. 10 is a simplified diagram illustrating the calculation principle of the multiplier-adder used in FIGS. 8 and 9.

The first axial route comprises an analog multiplier-adder which performs the following operation:

$(va+vb)\cdot Va+ka\cdot Vref$ in the same way as previously, the output from m5 powers a demodulator D5 followed by an integrator IT5, which generates the continuous axial voltage Va. Multiplier M5, like multipliers m3, m4 and m5 described in FIGS. 8 and 9, is a multiplier-adder operating in the manner illustrated in FIG. 10. This multiplier comprises three inputs X, Y represented in the lateral inputs, and Z represented facing output W. Output W is given by $W=XY+Z$. This multiplier is of analog or digital type.

Then, in FIG. 9, IT5, through its positive earthed input, applies a null voltage to output S5:

$(va+vb)\cdot Va+ka\cdot Vref=0$

Where $Vref\cdot(Ma+Mb)=va+vb$, giving:

$Va=-ka/(Ma+Mb)$

The second radial route comprises an analog multiplier which performs the following operation:

$Vr\cdot(va+vb)+(va-vb)$

In the same way as previously, output m6 powers a demodulator D6 followed by an integrator IT6, which generates continuous radial voltage Vr. IT6, through its positive earthed input, applies a null voltage to output S6:

$Vr\cdot(va+vb)+(va-vb)=0$

Where $Vref\cdot(Ma-Mb)=va-vb$ and $Vref\cdot(Ma+Mb)=va+vb$, giving:

$Vr=-(Ma-Mb)/(Ma+Mb)$

Of course, the invention is not limited to the examples that were just described and numerous reconfigurations may be made to these examples without leaving the scope of the invention.

The invention claimed is:

1. A non-contact measurement method for a relative displacement or relative positioning of a first object relative to a second object, in which:

at least one transmitting coil, placed on the first object, is excited by an alternating excitation signal, at least two alternating electronic output signals, generated by mutual inductance in at least two receiving coils, are detected; said at least two receiving coils being placed on said second object and in a magnetic field created by said at least one transmitting coil, the relative displacement of the first object is determined relative to the second object using said at least two alternating electric output signals generated on said at least two receiving coils, an axial displacement is determined by measuring a continuous axial voltage Va that is proportional to a monotone function of mutual inductance M between one of said at least one transmitting coil and one of said at least two receiving coils, said at least two receiving coils generate, respectively, an alternating voltage va that is proportional to mutual inductance Ma between a first of said at least two receiving coils and one of said at least one transmitting coil, and an alternating voltage vb that is proportional to the mutual inductance Mb between a second of said at least two receiving coils and one of said at least one transmitting coil, a radial displacement is determined by measuring a continuous radial voltage Vr proportional to the relation (Ma−Mb)·f(Ma+Mb); where (Ma−Mb) is the difference between mutual inductances Ma and Mb, where f(Ma+Mb) is a monotone function of the sum (Ma+Mb) of mutual inductances Ma and Mb; where Ma is the mutual inductance between one of said at least one transmitting coil and a first of said at least two receiving coils, where Mb is the mutual inductance between one of said at least one transmitting coil and a second of said at least two receiving coils.

2. The method according to claim 1, characterized in that an axial displacement is determined by measuring a continuous axial voltage Va which is proportional to a monotone function of the sum of mutual inductances Ma and Mb, where Ma is the mutual inductance between one of said at least one transmitting coil and a first of said at least two receiving coils, where Mb is the mutual inductance between one of said at least one transmitting coil and a second of said at least two receiving coils.

3. The method according to claim 1, characterized in that said monotone function consists of an inverse function.

4. The method according to claim 1, characterized in that the amplitude of the excitation signal of said at least one transmitting coil is triggered by continuous axial voltage Va.

5. The method according to claim 1, characterized in that the amplitude of the excitation signal is held constant; and to measure the relative displacement, means of calculating continuous voltage Va is triggered by this continuous axial voltage Va.

6. The method according to claim 1, characterized in that said at least one transmitting coil is arranged facing the receiving coils.

7. The method according to claim 1, characterized in that differential coils are used.

8. The method according to claim 1, characterized in that the coils are rectangular, square or circular in shape.

9. The method according to claim 1, characterized in that the coils are called flat or planar.

10. The method according to claim 1, characterized in that the coils are made in the shape of loops arranged directly on said objects.

11. The method according to claim 1, characterized in that the coils are made in the shape of loops arranged on flexible circuits, where these flexible circuits are arranged on said objects.

12. The method according to claim 1, characterized in that the coils are arranged on a material with a very low thermal expansion coefficient in order to greatly reduce the deformation of these arranged coils.

13. The method according to claim 1, characterized in that said alternating excitation signal is an alternating voltage.

14. The method according to claim 1, characterized in that said alternating excitation signal is an alternating current.

15. The method according to claim 1, characterized in that said alternating electric output signal is an alternating voltage.

16. The method according to claim 1, characterized in that said alternating electric output signal is an alternating current.

17. The method according to claim 1, characterized in that the transmitting and receiving coils are, respectively, arranged on two adjacent lateral sides of two mirrors of a telescope.

18. Application of the method according to claim 1 for controlling the position of segmented telescope mirrors.

19. Application of the method according to claim 1 for controlling the alignment of segmented telescope mirrors.

20. Application of the method according to claim 19, for controlling the position of mirror's segments.

21. A non-contact measurement method for a relative displacement or relative positioning of a first object relative to a second object, in which:

at least two transmitting coils, placed on the first object, are excited by an alternating excitation signal, at least one alternating electronic output signal, generated by mutual inductance in at least one receiving coil, is detected; said at least one receiving coil being placed on said second object and in a magnetic field created by said at least two transmitting coils, the relative displacement of the first object is determined relative to the second object using said at least one alternating electric output signal generated on said at least one receiving coil, an axial displacement is determined by measuring a continuous axial voltage Va that is proportional to a monotone function of mutual inductance M between a transmitting coil of said at least two transmitting coils and a receiving coil of said at least one receiving coil, for a given coil position of two transmitting coils of said at least two transmitting coils and one receiving coil, an inductance equilibrium voltage is determined at the output of the receiving coil, and the radial position of the two objects is triggered by said equilibrium voltage.

22. The method according to claim 21, characterized in that the equilibrium voltage is null.

23. The method according to claim 21, characterized in that the two transmitting coils are excited by two opposite excitation signals.

24. A system for measuring relative displacement or relative positioning of a first object relative to a second object, comprising:

at least two transmitting coils placed on said first object, at least one receiving coil placed on the second object, means of excitation for said at least two transmitting coils into an alternating excitation signal, means of processing for recovering at least one alternating electric output signal, generated by mutual inductance in one of said at least two receiving coils, and for determining the relative displacement of the first object in relation to the second object using said alternating electric output signal generated on said receiving coil, a transmitting coil of said at least two transmitting coils and a receiving coil of said at least one receiving coil for measuring an axial displacement of objects by determining an axial voltage Va that is proportional to a monotone function of the mutual inductance between said coils, two transmitting coils of said at least two transmitting coils powered by two opposite excitation signals to control radial positioning.

25. The system according to claim 24, characterized in that it comprises two transmitting coils powered in series by the same alternating current.

26. A system for measuring relative displacement or relative positioning of a first object relative to a second object, comprising:

at least one transmitting coil placed on said first object,
at least two receiving coils placed on the second object,
means of excitation for said at least one transmitting coil into an alternating excitation signal,
means of processing for recovering at least one alternating electric output signal, generated by mutual inductance in one of said at least one receiving coil, and for determining the relative displacement of the first object in relation to the second object using said alternating electric output signal generated on said receiving coil,
a transmitting coil of said at least one transmitting coil and a receiving coil of said at least two receiving coils for measuring an axial displacement of objects by determining an axial voltage Va that is proportional to a monotone function of the mutual inductance between said coils,
wherein said means of processing comprise means of calculation for determining a continuous voltage Vr which represents a radial displacement and which is proportional to the relation (Ma−Mb)·f(Ma+Mb); where (Ma−Mb) is the difference of mutual inductances Ma and Mb, f(Ma+Mb) is a monotone function of the sum (Ma +Mb) of mutual inductances Ma and Mb; where Ma is the mutual inductance between one of said at least one transmitting coil and a first of said at least two receiving coils, where Mb is the mutual inductance between one of said at least one transmitting coil and a second of said at least two receiving coils.

27. The system according to claim 26, characterized in that said two receiving coils are mounted in series so that they determine the sum of two mutual inductances between each receiving coil and one of said at least one transmitting coil.

28. The system according to claim 26, characterized in that said two receiving coils are mounted differentially to determine the difference of two mutual inductances between each receiving coil and one of said at least one transmitting coil.

29. The system according to claim 26, characterized in that said monotone function comprises an inverse function.

30. The system according to claim 26, characterized in that the processing method comprises an adding amplifier designed to produce the sum va+vb of the voltages generated by the receiving coils.

31. The system according to claim 26, characterized in that the processing method comprise a differential amplifier designed to produce the difference va−vb of voltages generated by the receiving coils.

32. Application of the non-contact measuring system according to claim 26, for measuring the relative position between two adjacent mirror segments.

33. The application according to claim 32, in which plates that are respectively transmitter and receiver are attached to lateral walls facing two adjacent mirror segments, in close proximity to the active surfaces of said mirror segments.

34. The application according to claim 32, in the sector of large-size, segmented-mirror telescopes.

35. The application of the non-contact measurement system according to claim 26, for non-contact measurement of position and displacement in one or two axes.

36. A system for measuring relative displacement or relative positioning of a first object relative to a second object, comprising:

at least one transmitting coil placed on said first object,
at least two receiving coils placed on the second object,
means of excitation for said at least one transmitting coil into an alternating excitation signal,
means of processing for recovering at least one alternating electric output signal, generated by mutual inductance in one of said at least one receiving coil, and for determining the relative displacement of the first object in relation to the second object using said alternating electric output signal generated on said receiving coil,
a transmitting coil of said at least one transmitting coil and a receiving coil of said at least two receiving coils for measuring an axial displacement of objects by determining an axial voltage Va that is proportional to a monotone function of the mutual inductance between said coils,
wherein said means of processing comprise means of calculation for determining a continuous axial voltage Va which represents an axial displacement and which is proportional to a monotone function of the sum of the mutual inductances Ma and Mb, where Ma is the mutual inductance between a transmitting coil of said at least one transmitting coil and a first receiving coil of said at least two receiving coils, and where Mb is the mutual inductance between a transmitting coil of said at least one transmitting coil and a second receiving coil of said at least two receiving coils, and,
wherein said means of calculation comprises:
an adder for adding the sum of alternating voltages va+vb of said first and second receiving coils with a reference voltage Vref,
a demodulator for demodulating the signal emitted by said adder,
an integrator for generating continuous axial voltage Va using the signal emitted by the demodulator, and
a multiplier that is powered by the continuous axial voltage Va and the reference voltage Vref so that said excitation signal is generated; where the relative motion is a function of the value of Va for which the output of said adder is null.

37. A system for measuring relative displacement or relative positioning of a first object relative to a second object, comprising:

at least one transmitting coil placed on said first object,
at least two receiving coils placed on the second object,
means of excitation for said at least one transmitting coil into an alternating excitation signal,
means of processing for recovering at least one alternating electric output signal, generated by mutual inductance in one of said at least one receiving coil, and for determining the relative displacement of the first object in relation to the second object using said alternating electric output signal generated on said receiving coil,
a transmitting coil of said at least one transmitting coil and a receiving coil of said at least two receiving coils for measuring an axial displacement of objects by determining an axial voltage Va that is proportional to a monotone function of the mutual inductance between said coils, wherein said means of processing comprise means of calculation for determining a continuous axial voltage Va which represents an axial displacement and which is proportional to a monotone function of the sum of the mutual inductances Ma and Mb, where Ma is the mutual inductance between a transmitting coil of said at least one transmitting coil and a first receiving coil of said at least two receiving coils, and where Mb is the mutual inductance between a transmitting coil of said at least one transmitting coil and a second receiving coil of said at least two receiving coils, and, said means of calculation comprises:

a multiplier adder for adding a reference voltage Vref to a feedback signal multiplied by the sum va+vb of voltages generated by said first and second receiving coils, a demodulator for demodulating the signal emitted by said multiplier, and an integrator for generating the continuous axial voltage Va using the signal emitted by the demodulator, where the feedback signal is the continuous axial voltage Va; and where the relative displacement is a function of the value of the continuous axial voltage Va for which the output of said multiplier is null.

38. A system for measuring relative displacement or relative positioning of a first object relative to a second object, comprising:

at least one transmitting coil placed on said first object, at least one receiving coil placed on the second object, means of excitation for said at least one transmitting coil into an alternating excitation signal, and means of processing for recovering at least one alternating electric output signal, generated by mutual inductance in said at least one receiving coil, and for determining the relative displacement of the first object in relation to the second object using said alternating electric output signal generated on the receiving coil, wherein:

said means of processing comprises means of calculation for determining a continuous voltage Vr which represents a radial displacement and which is proportional to the relation $(Ma-Mb) \cdot f(Ma+Mb)$; where $(Ma-Mb)$ is the difference of mutual inductances Ma and Mb, $f(Ma+Mb)$ is a monotone function of the sum $(Ma+Mb)$ of mutual inductances Ma and Mb; where Ma is the mutual inductance between the transmitting coil and a first receiving coil, where Mb is the mutual inductance between the transmitting coil and a second receiving coil, and said means of calculation comprises (i) an adder for adding the difference in alternating voltages Va−Vb of two receiving coils with a feedback signal, (ii) a demodulator for demodulating the signal emitted from said adder, (iii) an integrator for generating the continuous radial voltage Vr using the signal generated by the demodulator, and (iv) a multiplier powered by continuous radial voltage Vr and a reference voltage Vref for generating said feedback signal; where the relative displacement is a function of the value of the continuous radial voltage Vr for which the output of said multiplier is null.

39. The system according to claim 38, characterized in that, for all calculations, the reference voltage Vref is multiplied by a coefficient.

40. A system for measuring relative displacement or relative positioning of a first object relative to a second object, comprising:

at least one transmitting coil placed on said first object, at least one receiving coil placed on the second object, means of excitation for said at least one transmitting coil into an alternating excitation signal, and means of processing for recovering at least one alternating electric output signal, generated by mutual inductance in said at least one receiving coil, and for determining the relative displacement of the first object in relation to the second object using said alternating electric output signal generated on the receiving coil, wherein:

said means of processing comprises means of calculation for determining a continuous voltage Vr which represents a radial displacement and which is proportional to the relation $(Ma-Mb) \cdot f(Ma+Mb)$; where $(Ma-Mb)$ is the difference of mutual inductances Ma and Mb, $f(Ma+Mb)$ is a monotone function of the sum $(Ma+Mb)$ of mutual inductances Ma and Mb; where Ma is the mutual inductance between the transmitting coil and a first receiving coil, where Mb is the mutual inductance between the transmitting coil and a second receiving coil, and said means of calculation comprises: (i) a multiplier-adder for adding the difference Va−Vb in the voltages generated by the receiving coils with a feedback signal, multiplied by sum Va+Vb of the voltages generated by the receiving coils, (ii) a demodulator for demodulating the signal emitted by said multiplier, and (iii) an integrator for generating the continuous radial voltage Vr using the signal emitted by the demodulator, where said feedback signal is the continuous radial voltage Vr; where the relative displacement is the function of the value of the continuous radial voltage Vr for which the output of said multiplier is null.

\* \* \* \* \*